United States Patent
Jones et al.

(10) Patent No.: US 10,393,319 B2
(45) Date of Patent: *Aug. 27, 2019

(54) KINETIC HYDRATE INHIBITORS FOR CONTROLLING GAS HYDRATE FORMATION IN WET GAS SYSTEMS

(71) Applicant: Ecolab USA Inc., St. Paul, MN (US)

(72) Inventors: Regan Andrew Jones, Sugar Land, TX (US); Jeremy Wayne Bartels, Sugar Land, TX (US); Jeremy Moloney, Katy, TX (US)

(73) Assignee: Ecolab USA Inc., St. Paul, MN (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/441,656

(22) Filed: Feb. 24, 2017

(65) Prior Publication Data

US 2017/0248276 A1  Aug. 31, 2017

Related U.S. Application Data

(60) Provisional application No. 62/300,552, filed on Feb. 26, 2016.

(51) Int. Cl.
| | |
|---|---|
| *F17D 3/12* | (2006.01) |
| *C09K 8/03* | (2006.01) |
| *C10L 3/10* | (2006.01) |
| *F17D 1/00* | (2006.01) |
| *F17D 1/04* | (2006.01) |
| *F17D 1/08* | (2006.01) |

(52) U.S. Cl.
CPC .............. *F17D 3/12* (2013.01); *C09K 8/03* (2013.01); *C10L 3/107* (2013.01); *F17D 1/005* (2013.01); *F17D 1/04* (2013.01); *F17D 1/08* (2013.01); *C10L 2230/14* (2013.01); *C10L 2250/04* (2013.01); *C10L 2290/141* (2013.01)

(58) Field of Classification Search
CPC . C09K 8/03; C09K 8/035; C09K 8/24; C09K 8/504; F17D 1/005; F17D 1/04; F17D 1/08; F17D 3/12; C10L 2230/14; C10L 2250/04; C10L 2290/141; C10L 3/107
See application file for complete search history.

(56) References Cited

U.S. PATENT DOCUMENTS

| | | | |
|---|---|---|---|
| 4,584,339 A | 4/1986 | Lundberg et al. | |
| 6,107,531 A | 8/2000 | Colle et al. | |
| 6,410,610 B1 | 6/2002 | Brehm | |
| 7,585,816 B2 | 9/2009 | Colle et al. | |
| 8,921,478 B2 | 12/2014 | Conrad et al. | |
| 2005/0081432 A1* | 4/2005 | Panchalingam | C09K 8/52 44/419 |
| 2010/0099807 A1 | 4/2010 | Carlise et al. | |
| 2010/0099814 A1* | 4/2010 | Conrad | C08F 220/56 524/555 |
| 2011/0240915 A1 | 10/2011 | Tian et al. | |
| 2015/0037202 A1* | 2/2015 | Harrington | C02F 5/10 422/7 |

FOREIGN PATENT DOCUMENTS

| | | |
|---|---|---|
| WO | 98/23843 A1 | 6/1998 |
| WO | 2005/042675 A2 | 5/2005 |
| WO | 2006/051265 A1 | 5/2006 |
| WO | 2007/143489 A2 | 12/2007 |
| WO | 2010/045523 A1 | 4/2010 |
| WO | 2013/096201 A1 | 6/2013 |
| WO | 2013/121217 A2 | 8/2013 |
| WO | 2014/052940 A1 | 4/2014 |
| WO | 2014/120437 A1 | 8/2014 |

OTHER PUBLICATIONS

International Search Report and Written Opinion issued for PCT/US2017/019358, dated Jun. 11, 2017, 12 pages.

* cited by examiner

*Primary Examiner* — Frances Tischler
(74) *Attorney, Agent, or Firm* — Stinson LLP

(57) ABSTRACT

The present invention generally relates to methods and hydrate inhibitor compositions for inhibiting the formation of hydrates in a fluid comprising gas and water. More specifically, the method comprises contacting a hydrate inhibitor composition to a fluid. The hydrate inhibitor composition comprises a nonpolar solvent; a polar solvent; and a polymer, an oligomer, a dendrimer, or an acid or salt thereof.

20 Claims, No Drawings

KINETIC HYDRATE INHIBITORS FOR CONTROLLING GAS HYDRATE FORMATION IN WET GAS SYSTEMS

CROSS REFERENCE TO RELATED APPLICATIONS

This application claims the benefit of U.S. Provisional Patent Application Ser. No. 62/300,552 filed on Feb. 26, 2016, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

The present invention generally relates to a method for inhibiting hydrate formation in a fluid comprising water and a gas. The method comprises contacting an effective amount of a hydrate inhibitor composition comprising a nonpolar solvent, a polar solvent, and either a polymer, an oligomer, a dendrimer, or an acid or salt thereof, to a fluid.

BACKGROUND OF THE INVENTION

Natural gas hydrates are crystalline solids composed of water and gas. In these solids, the gas molecules (guests) are trapped in water cavities (host) that are composed of hydrogen-bonded water molecules. Methane is the main gas in naturally occurring gas hydrates, however carbon dioxide, hydrogen sulfide, and less frequently, other hydrocarbons such as ethane and propane can be found within the hydrate structure. In 1934, Hammerschmidt determined that natural gas hydrates were blocking gas transmission lines, frequently at temperatures above the ice point. This discovery caused a more pragmatic interest in gas hydrates and led to the regulation of the water content in natural gas pipelines.

Gas hydrates can be easily formed during the transportation of oil and gas in pipelines under certain conditions. Factors affecting gas hydrate formation include gas composition, water content, temperature, and pressure, particularly low temperature and high pressure. While these crystalline cage-like structures are initially small, they are able to agglomerate into solid masses called gas hydrate plugs. The formation of gas hydrates within a pipeline often results in lost oil or gas production, damage to transmission lines and equipment, and safety hazard to field workers.

Three types of hydrate inhibitors are currently available to the energy industry for controlling gas hydrates: thermodynamic hydrate inhibitors (THIs), kinetic hydrate inhibitors (KHIs), and anti-agglomerants (AAs). Kinetic hydrate inhibitors are substances that can delay gas hydrate nucleation and crystal growth at a given temperature and pressure. Water-soluble polymers combined with small organic molecules are commonly used as kinetic hydrate inhibitors. The polymers must contain functional group(s) capable of hydrogen bonding to water molecules or gas hydrate particle surfaces and hydrophobic group(s) adjacent to or the hydrogen bonding groups.

Accordingly, there is an ongoing need for compositions and methods that effectively prevent hydrate formations in water and gas transportation and handing processes, particularly those formulations without an oil phase which results in a water cut approaching 100%.

BRIEF SUMMARY OF THE INVENTION

One aspect of the invention is directed to a method for inhibiting hydrate formation in a fluid comprising water and a gas (i.e., hydrocarbon gas). The method comprises contacting the fluid with an effective amount of a hydrate inhibitor composition. The hydrate inhibitor composition comprises a nonpolar solvent, a polar solvent, and either a polymer, an oligomer, a dendrimer, or a combination thereof.

Another aspect of the invention is directed to a method for inhibiting hydrate formation in a fluid comprising water and a gas, the method comprising contacting the fluid with an effective amount of a hydrate inhibitor composition. The composition comprises from about 5 wt. % to about 55 wt. % of heavy aromatic naphtha, and from about 0.1 wt. % to about 15 wt. % of 2-ethyl hexanol, and from about 0.1 wt. % to about 50 wt. % of a kinetic hydrate inhibiting polymer or a kinetic hydrate inhibiting oligomer.

An additional aspect of the invention is directed to a method for inhibiting hydrate formation in a fluid comprising water and a gas (i.e., hydrocarbon gas). The method comprises contacting the fluid with an effective amount of a hydrate inhibitor composition. The hydrate inhibitor composition comprises an oil-soluble corrosion inhibitor and either a polymer, an oligomer, a dendrimer, or a combination thereof.

Another aspect of the invention is directed to a method for inhibiting hydrate formation in a fluid comprising water and a gas, the method comprising contacting the fluid with an effective amount of a hydrate inhibitor composition. The composition comprises from about 5 wt. % to about 55 wt. % oil-soluble corrosion inhibitor and from about 0.1 wt. % to about 55 wt. % of a kinetic hydrate inhibiting polymer or a kinetic hydrate inhibiting oligomer.

Other objects and features will be in part apparent and in part pointed out hereinafter.

BRIEF DESCRIPTION OF THE SEVERAL VIEWS OF THE DRAWING

Not applicable.

DETAILED DESCRIPTION OF THE INVENTION

Hydrate inhibitor compositions are provided with improved performance in production streams having a high water cut. In particular, these hydrate inhibitor compositions are well suited for wet gas systems. These streams pose a challenge to control gas hydrate formation because of the high water-cut as the efficacy of the hydrate inhibitor is sometimes reduced in the absence of an oil phase. The hydrate inhibitor compositions provided herein can be formulated with a hydrocarbon to slightly reduce the water cut of the wet gas and enable the formation of a small oil cut. For example, the hydrate inhibitor compositions can comprise heavy aromatic naphtha to create a small oil phase thereby improving efficacy for gas hydrate inhibition. Additionally, these hydrate inhibitor compositions can be formulated with 2-ethyl hexanol to improve high temperature aqueous solubility, thus, reducing fouling in many systems.

A method for inhibiting hydrate formation in a fluid comprising water and a gas is provided. The method comprises contacting the fluid with an effective amount of a hydrate inhibitor composition comprising a nonpolar solvent; a polar solvent; and a polymer, an oligomer, a dendrimer, or an acid or salt thereof.

A hydrate inhibitor composition for use in the method can comprise, for example, from about 5 wt. % to about 55 wt. % of heavy aromatic naphtha, from about 0.1 wt. % to about 15 wt. % of 2-ethyl hexanol, and from about 0.1 wt. % to about 50 wt. % of a kinetic hydrate inhibiting polymer or a kinetic hydrate inhibiting oligomer.

An additional aspect of the invention is directed towards a method for inhibiting hydrate formation in a fluid comprising water and a gas, the method comprising contacting the fluid with an effective amount of a hydrate inhibitor composition comprising an oil-soluble corrosion inhibitor; and a polymer, an oligomer, a dendrimer, or an acid or salt thereof.

The hydrate inhibitor composition can comprise, for example, from about 5 wt. % to about 55 wt. % oil-soluble corrosion inhibitor and from about 0.1 wt. % to about 55 wt. % of a kinetic hydrate inhibiting polymer or a kinetic hydrate inhibiting oligomer.

The fluid comprising water and a gas can be substantially free of a liquid hydrocarbon before contacting the hydrate inhibitor composition. The fluid is substantially free of a liquid hydrocarbon when the fluid has a concentration of liquid hydrocarbon of less than about 0.5 wt. %, 0.4 wt. %, 0.3 wt. %, 0.2 wt. %, 0.1 wt. %, 0.05 wt. %, or 0.01 wt. %.

The gas can be a hydrocarbon gas. In particular, the hydrocarbon gas can comprise methane, ethane, propane, n-butane, isobutane, isopentane, or a combination thereof.

For the methods described herein, the polymer, oligomer, or dendrimer can be a kinetic hydrate inhibiting polymer, oligomer, or dendrimer.

The polymer can be a polyvinylcaprolactone; a polyvinylpyrrolidone; a copolymer of a polyvinylcaprolactone and a polyvinylpyrrolidone; a terpolymer of a polyvinylcaprolactone, a polyvinylpyrrolidone, and a polyvinyl acetate; a dendrimeric polyesteramide derived from hexahydrophthalic anhydride; diisopropanol amine, and N,N-bis(3-dimethylaminopropyl)amine; a substituted polyethyleneimine; a polyoxyalkylenediamine; a dicarboxylic acid-polyol polyester; a polycyclicpolyether polyol; a hyperbranched polyester polyol having hydroxyl end groups; a hyperbranched polyester polyamine; a hyperbranched polyamidoamine; a linear polyester polyamine; or a combination thereof.

Additionally, the polymer or oligomer can comprise repeat units derived from a first monomer, a second monomer, or a combination thereof.

The polymer or oligomer can comprise repeat units derived from a first monomer.

The first monomer can be an acrylamide monomer, acrylate monomer, N-vinyl monomer, N-vinyl caprolactam monomer, N-vinyl amine monomer, anhydride monomer, dicarboxylic acid monomer, diester monomer, diol monomer, amine monomer, diamine monomer, dihydroxy acid monomer, dihydroxy ester monomer, hydroxy ester monomer, hydroxy acid monomer, or a combination thereof.

The acrylamide monomer can comprise N-isopropyl methacrylamide, N-isopropylacrylamide, or a combination thereof.

The polymer or oligomer can also comprise repeat units derived from a second monomer.

The second monomer can comprise methacrylamidopropyltrimethylammonium chloride, 2-(dimethylamino)ethyl methacrylamide, 3-(acryloylamino)propyl]trimethyl ammonium chloride (APTAC), 2-acryloyloxyethyltrimethyl ammonium chloride (AETAC), 2-methacryloyloxyethyltrimethyl ammonium chloride (METAC), diallyldimethyl ammonium chloride (DADMAC), acryloyloxyethyldimethylbenzyl ammonium chloride (AEDBAC), or methacryloyloxyethyldimethylbenzyl ammonium chloride (MEDBAC), 2-acrylamido-2-methylpropane sulfonic acid (AMPS), 2-acrylamido-2-methylpropane sulfonic acid sodium salt (AMPS sodium salt), or a combination thereof.

When the 2-(dimethylamino)ethyl methacrylamide is used as a second monomer, the resulting polymer, oligomer, or dendrimer comprising repeat units derived therefrom can be reacted (i.e., salted) with an organic acid (e.g., acetic acid, acrylic acid, and the like) to make an acid salt of the amine group.

The polymer or oligomer can comprise a copolymer or cooligomer comprising repeat units derived from N-isopropyl methacrylamide, methacrylamidopropyltrimethylammonium chloride, 2-(dimethylamino)ethyl methacrylamide, or a combination thereof. For example, the polymer or oligomer can comprise a copolymer or cooligomer comprising repeat units derived from isopropyl methacrylamide and methacrylamidopropyltrimethylammonium chloride.

The weight average molecular weight of the polymer or oligomer can be from about 500 Daltons to about 25,000 Daltons. Preferably, the weight average molecular weight of the polymer or oligomer can be from about 1,000 Daltons to about 5,000 Daltons.

The nonpolar solvent can comprise an aromatic hydrocarbon solvent, an aliphatic hydrocarbon solvent, a cycloaliphatic hydrocarbon, or a combination thereof. Preferably, the nonpolar solvent comprises heavy aromatic naphtha, toluene, a xylene, a hexane, diesel, kerosene, a heptane, an octane, iso-octane, or a combination thereof. Preferably, the nonpolar solvent can comprise heavy aromatic naphtha.

The polar solvent can comprise an alcohol having a molecular weight of up to about 300 Daltons. For example, the polar solvent can comprise 2-ethyl hexanol, n-butanol, t-butanol, pentanol, hexanol, octanol, decanol, dodecanol, tetradecanol, hexadecanol, octadecanol, or a combination thereof. Preferably, the polar solvent comprises 2-ethyl hexanol.

The hydrate inhibitor composition can comprise from about 5 wt. % to about 55 wt. %, about 5 wt. % to about 50 wt. %, about 10 wt. % to about 55 wt. %, or about 10 wt. % to about 50 wt. % nonpolar solvent.

The hydrate inhibitor composition can comprise from about 0.1 wt. % to about 15 wt. %, about 0.1 wt. % to about 12 wt. %, about 0.1 wt. % to about 10 wt. %, about 0.5 wt. % to about 15 wt. %, about 0.5 wt. % to about 12 wt. %, about 0.5 wt. % to about 10 wt. %, about 1 wt. % to about 15 wt. %, about 1 wt. % to about 12 wt. %, or about 1 wt. % to about 10 wt. % polar solvent.

The hydrate inhibitor composition can comprise from about 0.1 wt. % to about 50 wt. %, about 0.1 wt. % to about 40 wt. %, about 0.1 wt. % to about 30 wt. %, about 5 wt. % to about 50 wt. %, or about 5 wt. % to about 40 wt. % polymer or oligomer.

Preferably, the hydrate inhibitor composition can comprise from 10 wt. % to about 50 wt. % nonpolar solvent; from about 0.1 wt. % to about 10 wt. % polar solvent; and from about 1 wt. % to about 40 wt. % polymer or oligomer.

More preferably, the hydrate inhibitor composition can comprise from about 10 wt. % to about 50 wt. % of heavy aromatic naphtha; from about 0.1 wt. % to about 10 wt. % of 2-ethyl hexanol; and from about 10 wt. % to about 40 wt. % of a kinetic hydrate inhibiting polymer or a kinetic hydrate inhibiting oligomer.

The amount of the polymer or oligomer is based on calculating the active amount of polymer in the composition. Thus, when using a 45-95 wt. % solution of a 20-30 wt. % active polymer solution, the amount of the active polymer in the solution is from about 9 wt. % (i.e., 45×20/100) to about 28.5 wt. % (i.e., 95×30/100).

The oil-soluble corrosion inhibitor can comprise a substituted or unsubstituted heterocyclic compound. In particular, the substituted or unsubstitued heterocyclic compound can comprise piperidine or a derivative thereof, pyrazine or a derivative thereof, pyridazine or a derivative thereof, pyrimidine or a derivative thereof, quinolone or a derivative thereof, iosoquinoline or a derivative thereof, or a combination thereof. Preferably, the substituted or unsubstitued heterocyclic compound can comprise 3-amino-2-picoline, 4-chloro-2-methoxy-pyridine, 2-(2-chloroethyl)pyridine, 3-methyl-4-chloropyridine, 4-ethoxypicolinaldehyde, 2,2'-dipicolylamine, 3-isocyanatopyridine, 2-amino-quinoline, 6-hydroxyquinoline, 6-bromo-2-chloro-4-methylquinoline, 4-iodoquinoline, 7-bromoquinoline, or a combination thereof.

When the hydrate inhibitor composition comprises an oil-soluble corrosion inhibitor and a kinetic hydrate inhibiting polymer or oligomer, the composition can comprise from about 5 wt. % to about 75 wt. %, about 5 wt. % to about 70 wt. %, about 5 wt. % to about 65 wt. %, about 5 wt. % to about 60 wt. %, about 5 wt. % to about 55 wt. %, about 5 wt. % to about 50 wt. %, about 15 wt. % to about 70 wt. %, about 15 wt. % to about 60 wt. %, about 15 wt. % to about 50 wt. %, about 25 wt. % to about 70 wt. %, about 25 wt. % to about 60 wt. %, about 25 wt. % to about 50 wt. %, about 35 wt. % to about 70 wt. %, about 35 wt. % to about 60 wt. %, or about 35 wt. % to about 50 wt. % oil-soluble corrosion inhibitor.

When the hydrate inhibitor composition comprises an oil-soluble corrosion inhibitor and a kinetic hydrate inhibiting polymer or oligomer, the composition can comprise from about 5 wt. % to about 80 wt. %, about 5 wt. % to about 70 wt. %, about 5 wt. % to about 65 wt. %, about 5 wt. % to about 60 wt. %, about 5 wt. % to about 55 wt. %, about 15 wt. % to about 80 wt. %, about 15 wt. % to about 70 wt. %, about 15 wt. % to about 60 wt. %, about 25 wt. % to about 80 wt. %, about 25 wt. % to about 70 wt. %, about 25 wt. % to about 60 wt. %, about 35 wt. % to about 80 wt. %, about 35 wt. % to about 70 wt. %, or about 35 wt. % to about 60 wt. % kinetic hydrate inhibiting polymer or oligomer.

The polymer or oligomer can have a weight average molecular weight of from about 500 Daltons to about 25,000 Daltons, from about 500 Daltons to about 20,000 Daltons, from about 500 Daltons to about 15,000 Daltons, from about 500 Daltons to about 10,000 Daltons, from about 500 Daltons to about 5,000 Daltons, from about 1,000 Daltons to about 25,000 Daltons, from about 1,000 Daltons to about 20,000 Daltons, or from about 1,000 Daltons to about 15,000 Daltons, from about 1,000 Daltons to about 10,000 Daltons. Preferably, the polymer or oligomer can have a weight average molecular weight of from about 1,000 Daltons to about 5,000 Daltons.

The hydrate inhibitor polymers can be synthesized by any means known in the art, such as, for example radical polymerization. For example, representative polymers can be prepared by the free radical polymerization of a first monomer (e.g., an acrylamide monomer) and a second monomer (e.g., a methacrylamidopropyltrimethylammonium chloride or 2-(dimethylamino)ethyl methacrylamide monomer). Synthesis of such polymers is known in the art and described, for example, in U.S. Pat. No. 8,921,478.

Typically, the hydrate inhibiting polymer or oligomer can be prepared by combining one or more vinyl monomers (e.g., monomers described as the first monomer and second monomer herein) in an alcohol solvent (e.g., diethylene glycol monoethyl ether) followed by stirring and heating the reacting mixture to about 100° C. for two hours. During this time, an initiator (e.g., t-butyl peroctanoate) is added to the reaction mixture.

The methods of the present invention involve contacting a hydrocarbon and water mixture with a suitable hydrate inhibitor composition. When an effective amount of the hydrate inhibitor composition is used, gas hydrate blockage is inhibited. In the absence of such an effective amount, gas hydrate blockage is not inhibited.

There are a number of factors that can be taken into account in determining the effective amount of the hydrate inhibitor composition, including, but not necessarily limited to, the proportion of water in the fluid, the nature of the gas (i.e., hydrocarbon gas), the nature of the hydrate-forming guest molecules, the temperature and pressure conditions that the mixture of gas and water are subject to, the particular hydrate inhibitor composition employed, etc. Routine experimentation with a particular set of conditions and/or in a specific system can determine the optimum dosage range to avoid the formation of problematic quantities of irreversible, harmful gas hydrate masses. For example, when considering the appropriate dose or whether additional doses of the hydrate inhibitor composition are needed, the temperature, pressure, brine composition, brine volume, oil composition, oil volume, and gas composition can be considered for a particular system to determine the effective amount of the hydrate inhibitor composition to inhibit gas hydrate agglomeration under the conditions present for the particular system to be treated.

The total time of gas hydrate inhibition will be dependent on oil field conditions and the number of applications. The gas hydrate formation can be inhibited for at least 144, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490. 500. 510, 520. 530, 540, 550, 560, 570, 580, 590, 600, 610, 620, 630, 640, 650, 660, 670, 680, 690, 700, 710, or 720 hours. Preferably, the gas hydrate formation can be inhibited for from about 144 hours to about 480 hours, about 144 hours to about 432 hours, about 144 hours to about 384 hours, about 144 hours to about 336 hours, about 144 hours to about 288 hours, about 144 hours to about 240 hours, or about 144 hours to about 192 hours.

The hydrate inhibitor composition is added into the mixture of hydrocarbons and water at any concentration effective to inhibit the formation of gas hydrate agglomerates under the given conditions. Accordingly, the effective amount of the compound can range from about 0.1 volume percent to about 10 volume percent based on the amount of produced water in the well system. Preferably, the effective amount of the composition can range from about 0.1 volume percent to about 5 volume percent. The effective amount of the composition can also range from about 0.5 volume percent to about 3 volume percent. Typically, the amount of produced water is based on the amount of produced water per day that is calculated from the average volume of production per day for a particular well. The effective amount of the composition can be provided to the system in one or more doses.

The hydrate inhibitor compositions are chemically compatible with various elastomers and metals. Elastomers screened for compatibility can include Neoprene (i.e., polychloroprene), Hypalon® (chlorosulfonated polyethylene synthetic rubber), nitrile butadiene rubber (NBR), ethylene propylene rubber (EPR), Teflon® (polytetrafluoroethylene), Kalrez® (perfluoro hydrocarbon elastomer), high density polyethylene (HDPE), Nylon 11 (polyamide bioplastic), polyether ether ketone (PEEK), ethylene propylene diene rubber (EPDM White), hydrogenated nitrile butadiene rubber (HNBR), Viton® A (perfluoro hydrocarbon elastomer), Viton® B (perfluoro hydrocarbon elastomer), and Chemraz® (perfluoro hydrocarbon elastomer). Metals screened for compatibility can include AISI 1018 carbon steel, Inconel® 625 nickel-chromium alloy, SS2507 stainless steel, copper, SS2205 stainless steel, Hastelloy C-276® (nickel-molybdenum-chromium alloy), SS304L stainless steel, and SS316L stainless steel. The elastomers and metals are screened for compatibility at the effective amount used in the system as described above. The compositions and compounds are chemically compatible with metals when they do not cause corrosion to occur to the stainless steel and mild carbon steel components of the system and are chemically compatible with elastomers when they do not cause mass change or swelling.

The hydrate inhibitor compositions preferably do not interfere or react with any corrosion inhibitor, scale inhibitor, or other production chemical additives that are used in the system.

Advantageously, the hydrate inhibitor compositions do not form emulsions or foams when stored or upon use in a system. Emulsion formation can cause water quality issues in disposal of the produced water and foaming of the produced liquid can cause handling and system upset problems.

The hydrate inhibitor compositions can also reduce friction or drag when fluids are transported. Thus, these compositions can act as drag reducers or friction reducers when added to the hydrocarbon fluids.

The methods are useful for inhibiting hydrate formation for many hydrocarbons and hydrocarbon mixtures. The methods are particularly useful for lighter or low-boiling, $C_1$-$C_5$ hydrocarbon gases or gas mixtures at ambient conditions. Non-limiting example of such gases include methane, ethane, propane, n-butane, isobutane, isopentane and mixtures thereof. Other examples include various natural gas mixtures that are present in many gas and/or oil formations and natural gas liquids. The hydrates of all these low-boiling hydrocarbons are also referred to as gas hydrates. The hydrocarbons may also comprise other compounds including, but not limited to, carbon dioxide, hydrogen sulfide, and other compounds commonly found in gas/oil formations or processing plants, either naturally occurring and/or used in recovering/processing hydrocarbons from the formation, and mixtures thereof.

The methods can be used at any pressure that allows formation of hydrocarbon gas hydrates. When the hydrocarbons in the mixture are lower boiling hydrocarbons or hydrocarbon gases at ambient conditions, the pressure is usually at or greater than atmospheric pressure (i.e. about 101 kPa), preferably greater than about 1 MPa, and more preferably greater than about 5 MPa. The pressure in certain formation or processing units or plants could be much higher, such as greater than about 20 MPa. There is no specific high-pressure limit.

The temperature for contacting the mixture with the hydrate inhibitor composition is usually approximately at or below ambient or room temperature. Lower temperatures tend to favor gas hydrate formation. At much higher temperatures, gas hydrates are less likely to form.

The compositions can include other means of gas hydrate inhibition, such as thermodynamic hydrate inhibitors and anti-agglomerant hydrate inhibitors. If mixtures of gas hydrate inhibitors are used, the mixture can be added to the hydrocarbon and water mixture through a single port or multiple ports. Alternatively, individual gas hydrate inhibitors can be added to separate ports to access the hydrocarbon mixture.

To ensure effective inhibition of formation of gas hydrates, the hydrate inhibitor composition should be injected prior to formation of gas hydrate crystals. The composition can be injected at the wellhead, at subsea, in a riser, or a flow line. Typically, the hydrate inhibitor composition is injected at the wellhead or below the wellhead. The treatment can also be used for pipelines or anywhere in the system where there is a potential for gas hydrate formation.

The composition is introduced into the fluid by any means suitable for ensuring dispersal of the hydrate inhibitor composition through the fluid being treated. Typically the hydrate inhibitor composition is injected using mechanical equipment such as chemical injection pumps, piping tees, injection fittings, and the like. The compositions can be pumped into the oil/gas pipeline by using an umbilical line. Also, capillary injection systems can be used to deliver the compositions. U.S. Pat. No. 7,311,144 provides a description of an apparatus and methods relating to capillary injection, which is herein incorporated by reference.

The contacting may be achieved in a number of ways, including mixing, blending with mechanical mixing equipment or devices, stationary mixing setup or equipment, magnetic mixing or other suitable methods, other equipment and means known to one skilled in the art and combinations thereof to provide adequate contact and/or dispersion of the hydrate inhibitor composition into the mixture. The contacting can be made in-line and/or offline. The various components of the composition may be mixed prior to and/or during contact. If needed or desired, the composition or some of its components can be optionally removed or separated mechanically, chemically, or by other methods known to one skilled in the art, or by a combination of these methods after the gas hydrate formation conditions are no longer present.

The hydrate inhibitor composition can further comprise one or more additional components, each component independently selected from the group consisting of a corrosion inhibitor, a solvent, an asphaltene inhibitor, a paraffin inhibitor, a scale inhibitor, an emulsifier, a water clarifier, a dispersant, a biocide, a pH modifier, a surfactant, or a combination thereof.

As described herein, a "polymer" is a macromolecule having at least 20 repeat units.

As described herein, an "oligomer" is a substance having from 5-19 repeat units.

As described herein, a "dendrimer" is a macromolecule having a central core, dendritic structures (i.e., branches), and functional surface groups.

Unless otherwise indicated, an "alkyl" group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The terms "aryl" or "ar" as used herein alone or as part of another group (e.g., aralkyl) denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl. The term "aryl" also includes heteroaryl.

The term "hydrocarbon" as used herein describes a compound or substituent consisting exclusively of the elements carbon and hydrogen.

The term "substituted" as in "substituted aryl," "substituted alkyl," and the like, means that in the group in question (i.e., the alkyl, aryl or other group that follows the term), at least one hydrogen atom bound to a carbon atom is replaced with one or more substituent groups such as hydroxy (—OH), alkylthio, phosphino, amido (—CON($R_A$)($R_B$), wherein $R_A$ and $R_B$ are independently hydrogen, alkyl, or aryl), amino(-N($R_A$)($R_B$), wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—OC(O)$R_A$ wherein $R_A$ is alkyl or aryl), keto (—C(O)$R_A$ wherein $R_A$ is alkyl or aryl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

"Arylalkyl" means an aryl group attached to the parent molecule through an alkylene group. The number of carbon atoms in the aryl group and the alkylene group is selected such that there is a total of about 6 to about 18 carbon atoms in the arylalkyl group. A preferred arylalkyl group is benzyl.

"Inhibiting" includes both inhibiting and preventing the formation and agglomeration of hydrate crystals.

Having described the invention in detail, it will be apparent that modifications and variations are possible without departing from the scope of the invention defined in the appended claims.

EXAMPLES

The following non-limiting examples are provided to further illustrate the present invention.

Example 1: Synthesis of a Kinetic Hydrate Inhibitor (KHI) Polymer

A solution of N-isopropyl methacrylamide (2.145 g, 16.866 mmol, 65 polymer wt. %), a 50 wt. % active aqueous methacrylamidopropyl trimethylammonium chloride solution (0.330 g, 0.747 mmol, 5 polymer wt. %), and diethylene glycol monoethyl ether (7.535 g, 7.535 mL) were combined, stirred, and heated to 105° C. in a capped vial which was vented to the atmosphere with a needle. During heating, the vial cap was removed and t-butyl peroctanoate (0.990 g, 4.577 mmol, 30 polymer wt. %) was added. After heating for 2 hours, the vial was allowed to cool to 20 to 60° C. After the vial was cooled to 20 to 60° C., 2-ethyl hexanol (0.900 g, 1.084 mL) and heavy aromatic naphtha (8.100 g, 9.000 mL) were added to the vial via a syringe and the vial was shaken by hand.

Example 2: Rocking Cell Tests

The rocking cell equipment consists of a rack of stainless steel cells mounted on a central axle immersed in a temperature-controlled bath. The bath temperature is moderated by a circulating chiller which is controlled by the integral computer. To rock the cells, the central axle is rotated by a computer-controlled stepper motor, which can rotate the cells up to 45° in each direction (that is, a 90° total rocking angle) at rocking rates of up to 20 times a minute. High-shear agitation of the fluids inside the cell is provided by the movement of a mixing ball (usually stainless steel although glass balls are also available) as the cells move. Each cell has a total volume of around 40 mL and will be filled with about 15 mL liquid which would give a gas:liquid ratio of ~1.7:1. Tests can also be performed to replicate the gas:liquid ratio of the autoclave or of the field.

Specifically, the test includes filling the cells with brine containing 1,000 ppm NaCl, 500 ppm acetic acid, and 250 ppm formic acid (11.6 mL), a 1.50-1.75 volume % of a hydrate inhibitor composition, and an amine based firm forming corrosion inhibitor (1,250 ppm). The cell was then flushed with a synthetic test gas, described in Table 2, at atmospheric pressure to displace the air. Following flushing, the cell was pressurized with a synthetic gas to 140 bar (2,030 psi) at 24° C. During the pressurization process, the pressure was monitored for any decreases, i.e., dissolution of the gas into the liquid, and if a decrease in pressure was detected, gas was added to maintain a constant pressure of 140 bar. After a constant pressure of 140 bar was achieved in the cells, the cells were isolated from the pressure source to create an isochoric process. The bath was cooled to a temperature representative of 4.3° C. subcooling. Once the desired temperature was achieved, the cells were rocked for 24 hours. After 24 hours, the rocking was turned off and the cells were maintained in a static position for 72 hours. The rocking was turned on again for another 24 hours. The temperature was decreased to a representative temperature of 5.8° C. subcooling. Once the temperature was reached, the cells were rocked until failure, or 10 days maximum. The temperature of the cells was increased to 24° C. The four-step testing ramp including various subcooling temperatures and mixing rates to mimic field conditions and is listed in Table 1.

TABLE 1

Standard KHI Performance Protocol

| Step | Subcooling (° C.) | Flowing Condition | Duration (h) |
| --- | --- | --- | --- |
| 1 | 4.3 | Mixing | 24 |
| 2 | 4.3 | Static | 72 |
| 3 | 4.3 | Mixing | 24 |
| 4 | 5.8 | Mixing | 24 |

The KHI performance tests were conducted with the sweet gas compositions listed in Table 2, below.

TABLE 2

Test Gas Compositions

| Component | Synthetic Test Gas (mol %) |
|---|---|
| $N_2$ | 8.47 |
| $CO_2$ | 11.34 |
| Methane | 78.64 |
| Ethane | 1.28 |
| Propane | 0.20 |
| n-Butane | 0.11 |
| Total | 100.0 |

The pass/fail criteria are based on the ability of a KHI to inhibit hydrate formation for 144 hours. Hydrate formation is indicated by a drop in pressure in the cell of psi. If hydrate formation occurred in the cell prior to 144 hours, then the test was considered a fail. The amount of time the KHI was able to inhibit hydrate formation is identified as the hold time. A reported hold time followed by '+' indicates hydrates were not formed when the test was stopped. A result of disqualification (DQ) indicates that there was a leak or a pressure transducer malfunction in the cell.

Example 3: Hot Injection Tests

Kinetic hydrate inhibitors were tested using a hot injection test. Brine containing 1,000 ppm NaCl, 500 ppm acetic acid, and 250 ppm formic acid (17.5 mL) and a cross shaped stir bar were added to a 20 mL vial. The sample was stirred at 750 rpm and heated to 60° C. An amine based film forming corrosion inhibitor was injected at 1,250 ppm. The kinetic hydrate inhibitor composition was then injected at 1.75 vol. %. The temperature was held at 60° C. for 10-15 minutes while checking for fouling. The vial was then cooled to 20° C. and checked again for fouling.

Example 4: Effect of Solvent on Performance of KHI

Kinetic hydrate inhibitor polymers were prepared in accordance with Example 1, above. Compositions were prepared by combining the KHI polymer with heavy aromatic naphtha (HAN) and 2-ethyl hexanol (2-EH). The amounts of each component are listed in Table 3.

TABLE 3

Composition of KHI Polymer with HAN and 2-EH

| Composition | Polymer Solution Activity (wt. %) | Polymer solution (wt. %) | HAN (wt. %) | 2-EH (wt. %) |
|---|---|---|---|---|
| 4.1 | 24 | 100 | 0 | 0 |
| 4.2 | 24 | 80 | 20 | 0 |
| 4.3 | 24 | 80 | 15 | 5 |

The hydrate inhibitor compositions were subjected to the performance and hot injection tests as described in Examples 2 and 3. The results are listed in Table 4.

TABLE 4

Results of the Hot Injection and Performance Tests

| | Test | | | | | | # of |
|---|---|---|---|---|---|---|---|
| Composition | Hot inject | Hydrate inhibition | Cell 1 | Cell 2 | Cell 3 | Cell 4 | cells passing |
| 4.1 | Fail | Fail | 123 | 46 | 83 | 50 | 0 |
| 4.2 | Fail | Pass | 156+ | 156+ | 145 | 145 | 4 |
| 4.3 | Pass | Fail | 146 | 147 | DQ | 135 | 2 |

The addition of HAN improved the hydrate inhibition performance. The addition of 2-EH led to an improvement in the hot-injection test and a modest attenuation of hydrate inhibition performance.

Example 5: Optimization of KHI Solvent Package

Kinetic hydrate inhibitor polymers were prepared in accordance with Example 1. Compositions were prepared by combining the KHI polymer with HAN and 2-EH and are listed in Table 5. In these compositions, the wt. % of 2-EH was held constant while the wt. % of the HAN was varied.

TABLE 5

Composition of Polymer and Solvent Package

| Composition | Polymer Solution Activity (wt. %) | Polymer solution (wt. %) | HAN (wt. %) | 2-EH (wt. %) |
|---|---|---|---|---|
| 5.1 | 24 | 65 | 30 | 5 |
| 5.2 | 24 | 71.25 | 23.75 | 5 |
| 5.3 | 24 | 77.50 | 17.5 | 5 |
| 5.4 | 24 | 83.75 | 11.25 | 5 |
| 5.5 | 24 | 90 | 5 | 5 |

The hydrate inhibitor compositions were subjected to the performance and hot injection tests as described in Examples 2 and 3. The results are listed in Table 6.

TABLE 6

Results of the Hot Injection and Performance Tests

| Composition | Hot inject | Hydrate inhibition | Cell 1 | Cell 2 | # of cells passing |
|---|---|---|---|---|---|
| 5.1 | Pass | Pass | 150 | 148 | 2 |
| 5.2 | Pass | Fail | 130 | — | 0 |
| 5.3 | Pass | Fail | 124 | DQ | 0 |
| 5.4 | Pass | Fail | 125 | — | 0 |
| 5.5 | Pass | Fail | 126 | 124 | 0 |

Only composition 5.1 provided optimal performance in both the hot injection and hydrate inhibition tests. These results indicate that increased HAN concentration leads to improved performance.

Example 6: Optimization of 2-EH Concentration

Kinetic hydrate inhibitor polymers were prepared in accordance with Example 1. Compositions were prepared by combining the KHI polymer with HAN and 2-EH and are listed in Table 7. The wt. % of 2-ethyl hexanol was adjusted as compared to the compositions described in Example 5.

TABLE 7

Compositions of Polymer and Solvent Package

| Composition | Polymer Solution Activity (wt. %) | Polymer solution (wt. %) | HAN (wt. %) | 2-EH (wt. %) |
|---|---|---|---|---|
| 6.1 | 24 | 65 | 35 | 0 |
| 6.2 | 24 | 65 | 34 | 1 |
| 6.3 | 24 | 65 | 33 | 2 |
| 6.4 | 24 | 65 | 32 | 3 |
| 6.5 | 24 | 65 | 31 | 4 |
| 6.6 | 24 | 65 | 30 | 5 |

The hydrate inhibitor compositions were subjected to the performance and hot injection tests as described in Examples 2 and 3. The results are listed in Table 8.

TABLE 8

Results of the Hot Injection and Performance Tests

| Composition | Hot injection |
|---|---|
| 6.1 | Fail |
| 6.2 | Fail |
| 6.3 | Borderline |
| 6.4 | Pass |
| 6.5 | Pass |
| 6.6 | Pass |

Reducing the wt. % of 2-EH lower than 3 wt. %, negatively affected the performance in the hot injection test.

Example 7: Effects of Increased Polymer Activity in Polymerization Step

Kinetic hydrate inhibitor polymers were prepared in accordance with Example 1. Compositions were prepared by combining the KHI polymer with HAN and 2-EH and are listed in Table 9. The wt. % of HAN and 2-EH were held constant while the wt. % activity of the polymer was varied.

TABLE 9

Formulations of Polymer and Solvent Package

| Formulation | Polymer Solution Activity (wt. %) | Polymer solution (wt. %) | HAN (wt. %) | 2-EH (wt. %) |
|---|---|---|---|---|
| 7.1 | 24 | 65 | 32 | 3 |
| 7.2 | 27 | 65 | 32 | 3 |
| 7.3 | 30 | 65 | 32 | 3 |

The hydrate inhibitor compositions were subjected to the performance and hot injection tests as described in Examples 2 and 3. The results are listed in Table 10.

TABLE 10

Results of the Hot Injection and Performance Tests

| Composition | Number Average MW | Hot inject Test | Hydrate inhibition Test | Cell 1 | Cell 2 | Cell 3 | Cell 4 | # of cells passing |
|---|---|---|---|---|---|---|---|---|
| 7.1 | 1,329 | Pass | Fail | 143 | 140 | 134 | 15 | 0 |
| 7.2 | 1,251 | Pass | Fail | 138 | 138 | 138 | 138 | 0 |
| 7.3 | 1,259 | Pass | Fail | 138 | 143 | 138 | 139 | 0 |

The increased polymer activity did not lead to a significant boost in performance, nor did it significantly affect polymer molecular weight.

Example 8: Further Optimization of KHI Solvent Package

Kinetic hydrate inhibitor polymers were prepared in accordance with Example 1. Compositions were prepared by combining the KHI polymer with HAN and 2-EH and are listed in Table 11. The wt. % activity of the polymer was held constant while the wt. % of the polymer solution, heavy aromatic naphtha, and 2-ethyl hexanol were varied.

TABLE 11

Compositions of Polymer and Solvent Package

| Composition | Activity (wt. %) | Polymer solution (wt. %) | HAN (wt. %) | 2-EH (wt. %) |
|---|---|---|---|---|
| 8.1 | 30 | 60 | 36 | 4 |
| 8.2 | 30 | 55 | 40.5 | 4.5 |
| 8.3 | 30 | 50 | 45 | 5 |

The hydrate inhibitor compositions were subjected to the performance and hot injection tests as described in Examples 2 and 3. The results are listed in Table 12.

TABLE 12

Results of the Hot Injection and Performance Tests

| Composition | Hot inject Test | Hydrate inhibition Test | Cell 1 | Cell 2 | Cell 3 | Cell 4 | # of cells passing |
|---|---|---|---|---|---|---|---|
| 8.1 | Pass | Pass | 161+ | 161+ | 161+ | 161+ | 4 |
| 8.2 | Pass | Pass | 161+ | 161+ | 161+ | 161+ | 4 |
| 8.3 | Pass | Pass | DQ | 161+ | 161+ | DQ | 2 |

Compositions with at least 40% solvent package passed the hydrate inhibition test.

Example 9: Reduction of Hydrate Inhibitor Composition Dose Rate to 1.50%

Kinetic hydrate inhibitor polymers were prepared in accordance with Example 1. Compositions were prepared by combining the KHI polymer with HAN and 2-EH and are listed in Table 13. The wt. % activity of the polymer was held constant while the wt. % of the polymer solution, HAN, and 2-EH were varied.

TABLE 13

Compositions of Polymer and Solvent Package

| Composition | Activity (wt. %) | Polymer solution (wt. %) | HAN (wt. %) | 2-EH (wt. %) |
|---|---|---|---|---|
| 9.1 | 30 | 55 | 40.5 | 4.5 |

The hydrate inhibitor compositions were subjected to the performance and hot injection tests as described in Examples 2 and 3, except the dose rate was decreased to 1.50 vol %. The results are listed in Table 14.

TABLE 14

Results of the Hot Injection and Performance Tests

| Composition | Test Hot inject | Test Hydrate inhibition | Cell 1 | Cell 2 | Cell 3 | Cell 4 | # of cells passing |
|---|---|---|---|---|---|---|---|
| 9.1 | Pass | Pass | 157 | 170 | 165 | 164 | 4 |

Compositions with at least 40% solvent package passed the hydrate inhibition test and the hot injection test at a reduced dose rate of 1.50 vol %.

Example 10: Visual Rocking Cell Test

The visual rocking cell equipment consists of rack of high pressure cells made from sapphire tubes. Each tube contains a stainless steel ball for mixing the fluids. To rock the tubes, the rack is moved up and down using a computer-controlled stepper motor. Each cell has a total volume of around 20 mL and will be filled with 10 mL liquid and then charged with a synthetic gas composition to the desired pressure. The rack containing the cells can be immersed in a temperature controlled water bath.

Specifically, the test includes filling the tubes with approximately 10 mL DI water, a 1.10-2.00 volume % of a hydrate inhibitor composition, and an alkyl pyridine or quinolone based corrosion inhibitor (45 wt. %), or HAN (45 wt. %). The tubes were then flushed with a synthetic gas composition, described in Table 15, at atmospheric pressure to displace the air. Following flushing, the cells were pressurized to 172 bar (2,500 psi) at 29° C. During the pressurization process, the pressure was monitored for any decreases, i.e., dissolution of the gas into the liquid, and if a decrease in pressure was detected, gas was added to maintain a constant pressure of 172 bar. After a constant pressure of 172 bar was achieved in the cells, the cells were isolated from the pressure source to create an isochoric process. The bath was cooled from 29° C. to 8.8° C. over the course of two hours. The tubes were rocked during the cooling process. The tubes were rocked at 8.8° C. until the end of the test.

TABLE 15

Synthetic Gas Composition

| Parameter | mole % |
|---|---|
| Nitrogen | 0.39 |
| Methane | 87.26 |
| Ethane | 7.57 |
| Propane | 3.10 |
| iso-Butane | 0.49 |
| n-Butane | 0.79 |
| iso-Pentane | 0.20 |
| n-Pentane | 0.20 |

Hydrate formation is indicated by a drop in pressure in the cell of psi. The amount of time the KHI was able to inhibit hydrate formation is identified as the hold time. A reported hold time followed by '+' indicates hydrates were not formed when the test was stopped.

Example 11: Effect of Corrosion Inhibitor on Performance of KHI

Kinetic hydrate inhibitor polymers were prepared in accordance with Example 1. Compositions were prepared by combining the KHI polymer with two corrosion inhibitors, an alkyl pyridine and a quinolone, and are listed in Table 16.

TABLE 16

Compositions of Polymer and Corrosion Inhibitor

| Composition | Dose Rate (vol % of water) | Polymer solution (wt. %) | HAN (wt. %) | Alkyl Pyridine (wt. %) | Quinoline (wt. %) |
|---|---|---|---|---|---|
| 11.1 | 1.10 | 100 | — | — | — |
| 11.2 | 1.10 | 100 | — | — | — |
| 11.3 | 2.00 | 55 | 45 | — | — |
| 11.4 | 2.00 | 55 | 45 | — | — |
| 11.5 | 2.00 | 55 | — | 45 | — |
| 11.6 | 2.00 | 55 | — | 45 | — |
| 11.7 | 2.00 | 55 | — | — | 45 |
| 11.8 | 2.00 | 55 | — | — | 45 |

The hydrate inhibitor compositions were subjected to the performance test as described in Example 10. The results are listed in Table 17.

TABLE 17

Results of the Performance Test

| Composition | Hydrate Inhibition (hrs) |
|---|---|
| 11.1 | 16 |
| 11.2 | 20 |
| 11.3 | 56+ |
| 11.4 | 56+ |
| 11.5 | 56+ |
| 11.6 | 56+ |
| 11.7 | 56+ |
| 11.8 | 56+ |

The addition of a corrosion inhibitor or HAN provided a significant performance increase to the KHI alone.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A method for inhibiting hydrate formation in a fluid comprising water and a gas, the method comprising contacting the fluid with an effective amount of a hydrate inhibitor composition comprising from about 20 to about 55 wt. % of a nonpolar solvent; from about 1 to about 15 wt. % of a polar solvent; and from about 0.1 to about 50 wt. % of a polymer, an oligomer, a dendrimer, or an acid or salt thereof.

2. The method of claim 1, wherein the polymer, oligomer, or dendrimer is a kinetic hydrate inhibiting polymer, oligomer, or dendrimer.

3. The method of claim 2, wherein the fluid is substantially free of a liquid hydrocarbon before contacting the hydrate inhibitor composition.

4. The method of claim 2, wherein the polymer or oligomer comprises repeat units derived from a first monomer, a second monomer, or a combination thereof; the first monomer comprising an acrylamide monomer, acrylate monomer, N-vinyl amide monomer, N-vinyl caprolactam monomer, N-vinyl amine monomer, anhydride monomer, dicarboxylic acid monomer, diester monomer, diol monomer, amine monomer, diamine monomer, dihydroxy acid monomer, dihydroxy ester monomer, hydroxy ester monomer, hydroxy acid monomer, or a combination thereof; and the second monomer comprising methacrylamidopropyltrimethylammonium chloride (MAPTAC), 2-(dimethylamino)ethyl methacrylamide, 3-(acryloylamino)propyl] trimethyl ammonium chloride (APTAC), 2-acryloyloxyethyltrim ethyl ammonium chloride (AETAC), 2-methacryloyloxyethyltrimethyl ammonium chloride (METAC), diallyldimethyl ammonium chloride (DADMAC), acryloyloxyethyldimethylbenzyl ammonium chloride (AEDBAC), or methacryloyloxyethyldimethylbenzyl ammonium chloride (MEDBAC), or a combination thereof.

5. The method of claim 2, wherein the polymer or oligomer is a copolymer or cooligomer comprising repeat units derived from N-isopropyl methacrylamide, methacrylamidopropyltrimethylammonium chloride, 2-(dimethylamino)ethyl methacrylamide, or a combination thereof.

6. The method of claim 5, wherein the polymer or oligomer is a copolymer or cooligomer comprising repeat units derived from isopropyl methacrylamide and methacrylamidopropyltrimethylammonium chloride.

7. The method of claim 2, wherein the weight average molecular weight of the polymer is from about 500 Daltons to about 25,000 Daltons.

8. The method of claim 2, wherein the nonpolar solvent comprises an aromatic hydrocarbon solvent, an aliphatic hydrocarbon solvent, a cycloaliphatic hydrocarbon solvent, or a combination thereof, and the polar solvent comprises an alcohol having a molecular weight less than 300 Daltons.

9. The method of claim 8, wherein the nonpolar solvent comprises heavy aromatic naphtha, toluene, a xylene, a hexane, a diesel, kerosene, a heptane, an octane, iso-octane, or a combination thereof, and the polar solvent comprises 2-ethyl hexanol, n-butanol, t-butanol, pentanol, hexanol, octanol, decanol, dodecanol, tetradecanol, hexadecanol, octadecanol, or a combination thereof.

10. The method of claim 9, wherein the nonpolar solvent comprises heavy aromatic naphtha, and the polar solvent comprises 2-ethyl hexanol.

11. The method of claim 2, wherein the hydrate inhibitor composition comprising from about 30 wt. % to about 45 wt. % of heavy aromatic naphtha; from about 4 to about 15 wt. % of 2-ethyl hexanol; and from about 15 to about 20 wt. % of the kinetic hydrate inhibiting polymer.

12. The method of claim 11, wherein the polymer has a weight average molecular weight of from about 500 Daltons to about 25,000 Daltons.

13. The method of claim 2, wherein the effective amount of a hydrate inhibitor composition is from about 0.1 volume % to about 10 volume % based on the total volume of produced water in the fluid comprising gas and water.

14. The method of claim 2, wherein the hydrate inhibitor composition comprising from about 20 wt. % to about 45 wt. % of the nonpolar solvent; from about 2 to about 15 wt. % of the polar solvent; and from about 15 to about 50 wt. % of the kinetic hydrate inhibiting polymer.

15. The method of claim 4, wherein the hydrate inhibitor composition comprising from about 20 wt. % to about 45 wt. % of the nonpolar solvent; from about 2 to about 15 wt. % of the polar solvent; and from about 15 to about 50 wt. % of the kinetic hydrate inhibiting polymer.

16. The method of claim 5, wherein the hydrate inhibitor composition comprising from about 20 wt. % to about 45 wt. % of the nonpolar solvent; from about 2 to about 15 wt. % of the polar solvent; and from about 15 to about 50 wt. % of the kinetic hydrate inhibiting polymer.

17. The method of claim 6, wherein the hydrate inhibitor composition comprising from about 20 wt. % to about 45 wt. % of the nonpolar solvent; from about 2 to about 15 wt. % of the polar solvent; and from about 15 to about 50 wt. % of the kinetic hydrate inhibiting polymer.

18. The method of claim 4, wherein the hydrate inhibitor composition comprising from about 30 wt. % to about 45 wt. % of heavy aromatic naphtha; from about 4 to about 15 wt. % of 2-ethyl hexanol; and from about 15 to about 20 wt. % of the kinetic hydrate inhibiting polymer.

19. The method of claim 2, wherein the hydrate inhibitor composition comprising from about 30 wt. % to about 45 wt. % of the nonpolar solvent; from about 4 to about 15 wt. % of the polar solvent; and from about 15 to about 50 wt. % of the kinetic hydrate inhibiting polymer.

20. The method of claim 2, wherein the hydrate inhibitor composition comprising from about 30 wt. % to about 45 wt. % of the nonpolar solvent; from about 4 to about 15 wt. % of the polar solvent; and from about 15 to about 50 wt. % of the kinetic hydrate inhibiting polymer.

* * * * *